(12) United States Patent
Costa

(10) Patent No.: US 7,497,307 B2
(45) Date of Patent: *Mar. 3, 2009

(54) HIDDEN BRAKE LINE SUSPENSION

(76) Inventor: Vincenzo F. Costa, 15572 Computer La., Huntington Beach, CA (US) 92649

( * ) Notice: Subject to any disclaimer, the term of this patent is extended or adjusted under 35 U.S.C. 154(b) by 409 days.

This patent is subject to a terminal disclaimer.

(21) Appl. No.: 11/340,087

(22) Filed: Jan. 26, 2006

(65) Prior Publication Data

US 2006/0220291 A1 Oct. 5, 2006

Related U.S. Application Data

(63) Continuation-in-part of application No. 11/062,196, filed on Feb. 18, 2005.

(51) Int. Cl.
*F16D 57/00* (2006.01)
(52) U.S. Cl. .............. 188/272; 188/322.12; 267/66; 267/68
(58) Field of Classification Search .......... 188/272, 188/322.12; 267/66, 68; 280/276, 275, 277, 280/279, 283, 284
See application file for complete search history.

(56) References Cited

U.S. PATENT DOCUMENTS

| 2,455,334 | A | * | 11/1948 | Schmidt et al. | ............. 137/580 |
| 4,327,928 | A | * | 5/1982 | Chalmers | ..................... 280/277 |
| 4,367,882 | A | * | 1/1983 | Alexander et al. | .......... 280/276 |
| 6,520,524 | B1 | * | 2/2003 | Costa | ......................... 280/276 |
| 6,848,721 | B2 | * | 2/2005 | Brans | ........................ 285/302 |

FOREIGN PATENT DOCUMENTS

WO       WO 9013470 A1 * 11/1990

* cited by examiner

*Primary Examiner*—Xuan Lan Nguyen
(74) *Attorney, Agent, or Firm*—Clement Cheng

(57) ABSTRACT

A motorcycle brake and suspension system has an outer tube, a mainspring mounted at least partially inside the outer tube. The mainspring has a smaller diameter than the outer tube, a pushrod mounted at least partially inside the mainspring. The pushrod has a smaller diameter than the mainspring. A brake line is mounted at least partially inside the pushrod. The brake line has a smaller diameter than the pushrod.

20 Claims, 3 Drawing Sheets

HIDDEN BRAKE LINE SUSPENSION

This application is a continuation in part of applicant's integrated motorcycle brake and suspension system Ser. No. 11/062,196 filed Feb. 18, 2005. This application incorporates by reference the disclosure made in the parent application.

DISCUSSION OF RELATED ART

Motorcycle brake lines have traditionally been mounted on the outside of the motorcycle fork leg. External brake line mounting provides interaction between the brake line and the external environment. External brake line mounting is therefore not as preferable. Internal brake line can improve a motorcycle fork leg performance. Also, exterior brake line mounting affects the aesthetics of the motorcycle. Aesthetic considerations in motorcycle design predominate in custom motorcycles. Unfortunately in internal brake line configurations, the brake line parts are normally inaccessible and internal to the fork leg, so the brake system must be elegantly designed to avoid mechanical complications.

The brake system of a suspension is typically controlled by a brake control that is connected to a fork leg such as the one that is attached to the present invention. A brake control typically known in the art is described in U.S. Pat. No. 5,476,162 entitled forward control for motorcycle rear brakes. The controller operated by a foot in turn operates a chamber that acts upon pressurized fluid. Pressurized fluid enters the suspension brake system and travels through the suspension brake system to operate the brake mounted on the fork leg.

BRIEF DESCRIPTION OF THE DRAWINGS

FIG. 1 has a cross section notation to FIG. 3 showing the FIG. 3 cross section plane.

DETAILED DESCRIPTION OF THE PREFERRED EMBODIMENT

Figure 1:
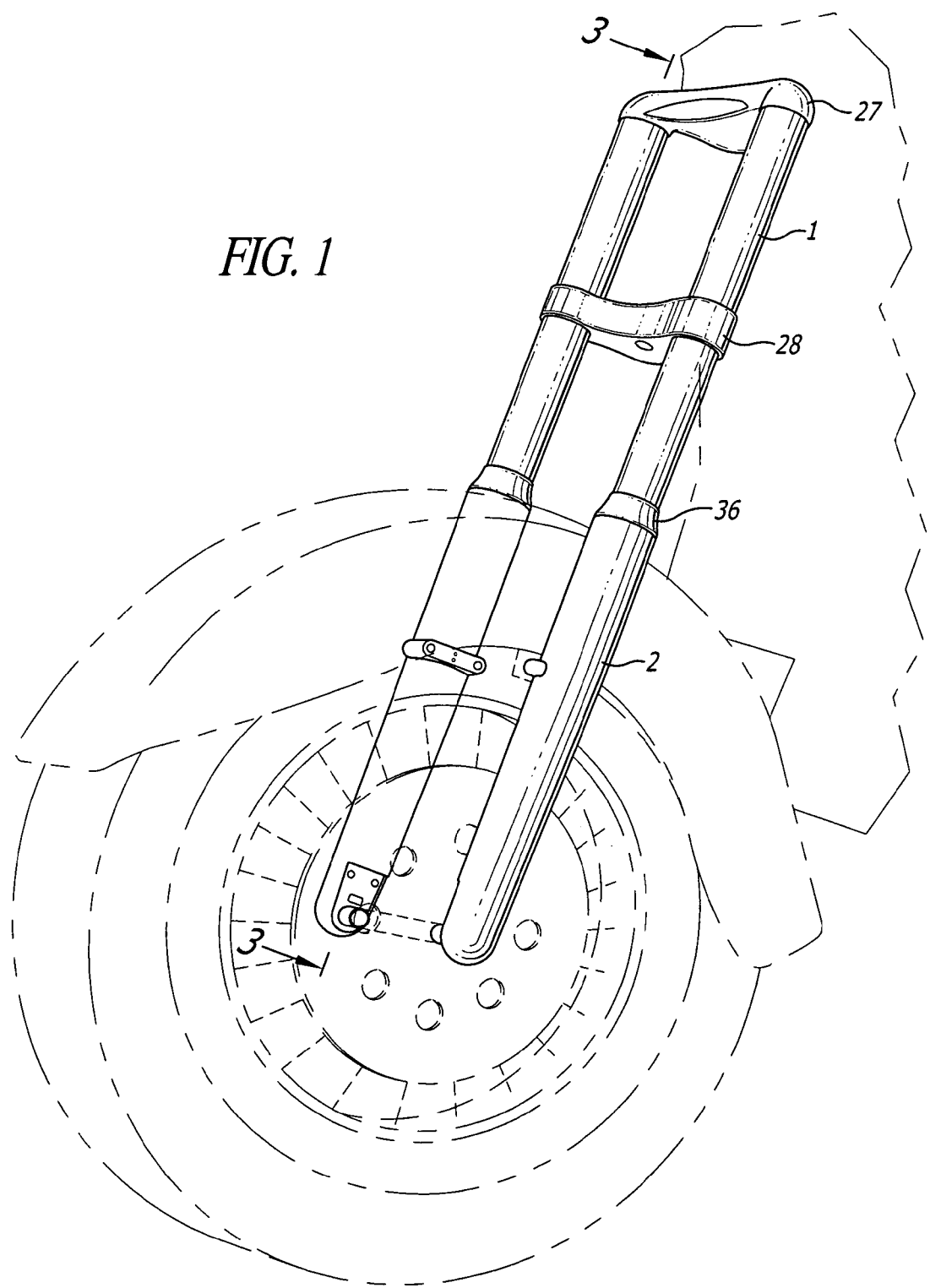
FIG. 1 is a perspective view of the hidden brake line device.

As shown in figure one, the inner tube 1 fits within the outside tube 2 and a seal cover 36 keeps debris out of the suspension system. The left and right legs are held by an upper triple clamp 27 and a lower triple clamp 36. The inside tube 1 slides inside of the outside tube 2 during operation. The telescoping configuration allows dynamic change of fork leg length depending upon the road and travel conditions. The present configuration is typically well-suited for a road bike and is not preferable for off-road operation, although off-road operation is also possible.

Figure 2:
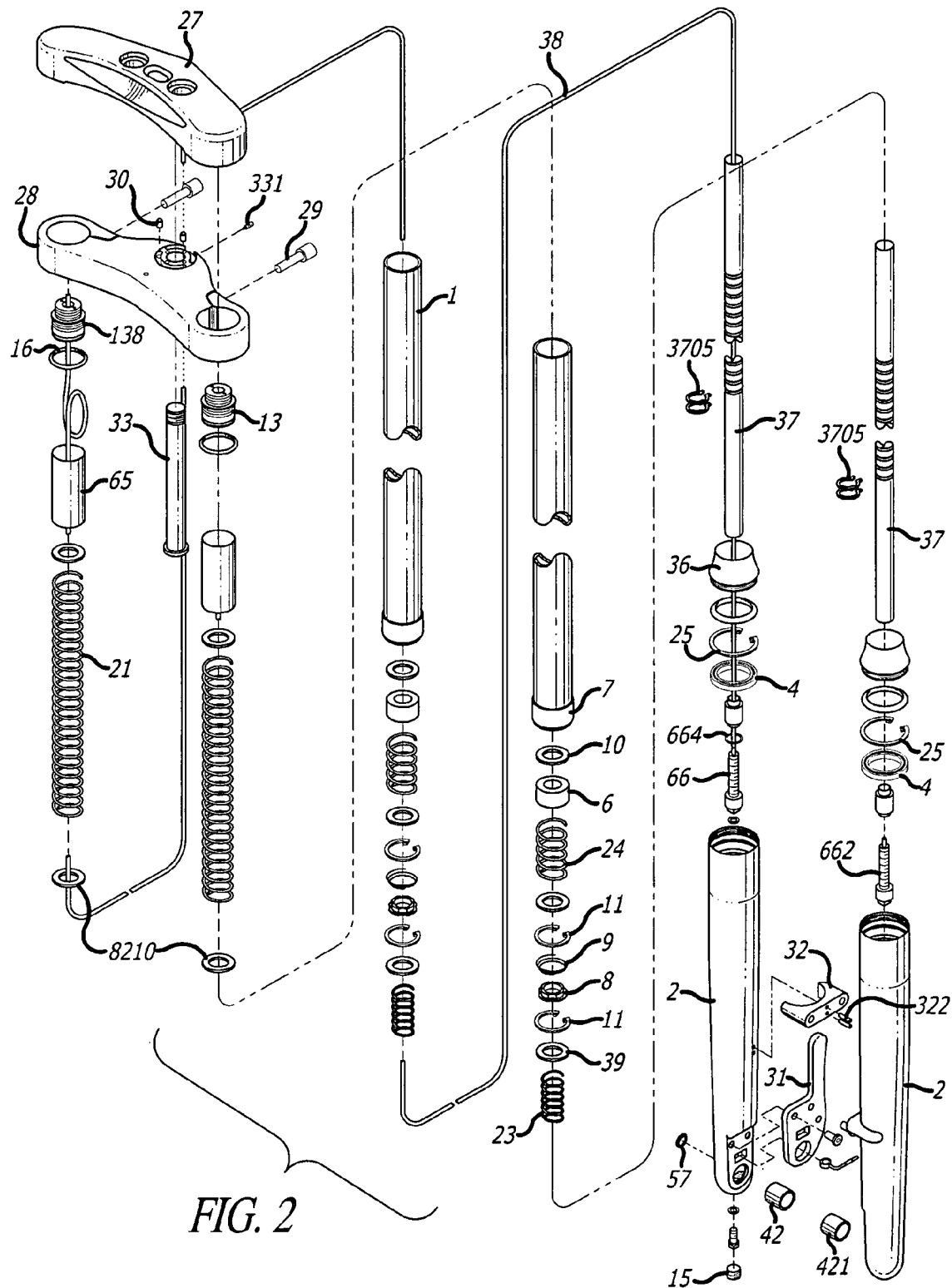
FIG. 2 is and exploded assembly view of the present invention.

FIG. 2 shows an exploded view showing assembly of the device where the parts fit together along the axis of the fourth leg. The bottom out spacer 65 is formed as a hollow short tube and retains a brake line loop and connects to the first body cap 13 and second body cap 138. The brake line loop allows slack so that upon contraction of the telescoping fork leg, the loop expands, and upon expansion of the telescoping fork leg, the loop contracts. Preferably, the loop is oval and greater than a circle at its most contracted position. The body cap secures the upper fork tree 27, to the inside tube 1. Each of the fork legs have a body cap, however the body cap that does not have the brake line does not require an opening to allow passage of a brake line. A steering stem 33 connects to the upper fork tree 27 and to the lower fork tree 28. Caliper bolts 29 retain the inside tube within the clamps. A pair of steering stop pins 30 are disposed within the lower fork tree 28 allowing steering control. To secure the steering stem, steering stem bolt 331 fits within the lower triple clamp 28. A pair of washers bound the main spring 21 on each side. The bottom washers 8210 fit between the mainspring 21 and the inside tube 1. A body cap 13, 138 has integrally formed a body cap O-ring, and additionally a caliper O-ring 16 to provide a shaft adapter 16. The shaft adapter O-ring 16 forms a seal.

The outside tube 1 has a top out bushing 7 at its lower terminal. The valve snap ring 10, damper rod piston 6 fits over the top out spring 24, which fits over the damper rod piston circlip 11. The directional control valve 8 has a directional control valve spring 9 a pair of circlips 11. The pair of circlips retains the directional control valve and there is an upper circlip and a lower circlip for each of the left and right legs. Although the circlips can be integrally formed with the directional control valve 8, standard circlips can be used on the directional control valve for cost considerations. The piston wiper seal fits over the piston seal 4. A seal snap ring 25 retains the piston seal 4. Thus, the outside tube is sealed and does not leak oil. The inside tube is also sealed and does not leak oil.

The damper bolt line crush washer 664 fits over the damper rod retainer bolt 66. The damper rod retainer bolt 66 secures to the damper rod, also called the push rod. The push rod also called the damper rod has a dual function in that it facilitates the dampening as well as absorbing shock pushing from the axle. The damper rod retainer bolt 66 has a hollow inside passage receiving hydraulic fluid, and has an outside threaded portion that screws into the damper rod. The banjo bolt 381 has a coupling to the damper rod retainer bolt, and receives hydraulic fluid from the damper rod retainer bolt 66. The banjo bolt has a hydraulic conduit through its body. The banjo bolt has a hydraulic passage that can go perpendicularly from the face that secures to the damper rod retainer bolt 66, up via connection members 401 and nut 386. The banjo bolt should preferably be as seen in the figures having a torus shaped main body communicating with a tube protruding from the main body. The tube extends preferably perpendicular from the main body, out through the slot that the banjo bolt was installed through. Thus, a portion of the banjo bolt preferably sticks out from the fork leg and can be attached to a brake system that is on the brake bracket 31. In FIG. 2, the banjo bolt has a connection line passing through the axle hole of the brake bracket 31. This does not signify that the banjo bolt is mounted through the axle hole, but rather the drawings place the location of the banjo bolt and connection lines for sake of clarity. It is obvious that the banjo bolt has a banjo bolt slot immediately above the axle hole of the brake bracket 31. The proper mounting procedure is to put the brake bracket 31 on the out side tube 2, then pass the banjo bolt through the banjo bolt slot. A wide variety of commercially available brake systems can be mounted to the brake bracket and connected to the terminal of the banjo bolt 381.

A bottom out washer 39 adapts to the bottom out spring 23. A bottom out spring 23 under the directional control valve 8 provides bottom out support the engagement height of which can be adjusted by main spring height adjustment mechanism 3705 here formed as a spring retainer clip 3705. Spring retainer clips 3705 fit into grooves of the retainer clip push rods 37. It is not required that the spring retainer clip 3705 fully surround the push rod 37.

The bottom out spring is activated when the mainspring 21 has exceeded its mechanical limit.

The bottom out spring 23 thus has a greater stiffness than the mainspring 21. The top out spring 24 similarly has a greater stiffness than the mainspring 21 as the top out spring 24 is activated when the mainspring 21 has exceeded its mechanical limit. As with typical mechanical design, the springs preferably rest upon washers for better force distribution.

The damper rod retainer bolt has a socket head and allows passage of the pressure in the cable 38 to pass through and connect to the lower portion of the fork leg. At the lower portion of the brake leg, a brake bracket 31 secures onto the lower leg by a bolt. A banjo bolt is typically a bolt having a bore through the main axis that meets at a perpendicular cross bore. The banjo bolt is commonly used in hydraulic applications. The banjo bolt fits inside a slot adapted to receive the banjo bolt. The banjo bolt 381 being hollow connects the brake line inside the fork and passes it to the brake mechanism mounted to the brake bracket 31.

The fender bracket 32 attaches to the lower leg outer tube 2 and is secured by a pair of fender bracket bolts 322. The fender of the motorcycle is then mounted on the fender bracket. The axle defined the lower portion of the fork leg has a cover 57. A bearing brake bracket bushing 42 fits within the aperture formed for the axle.

Figure 3:
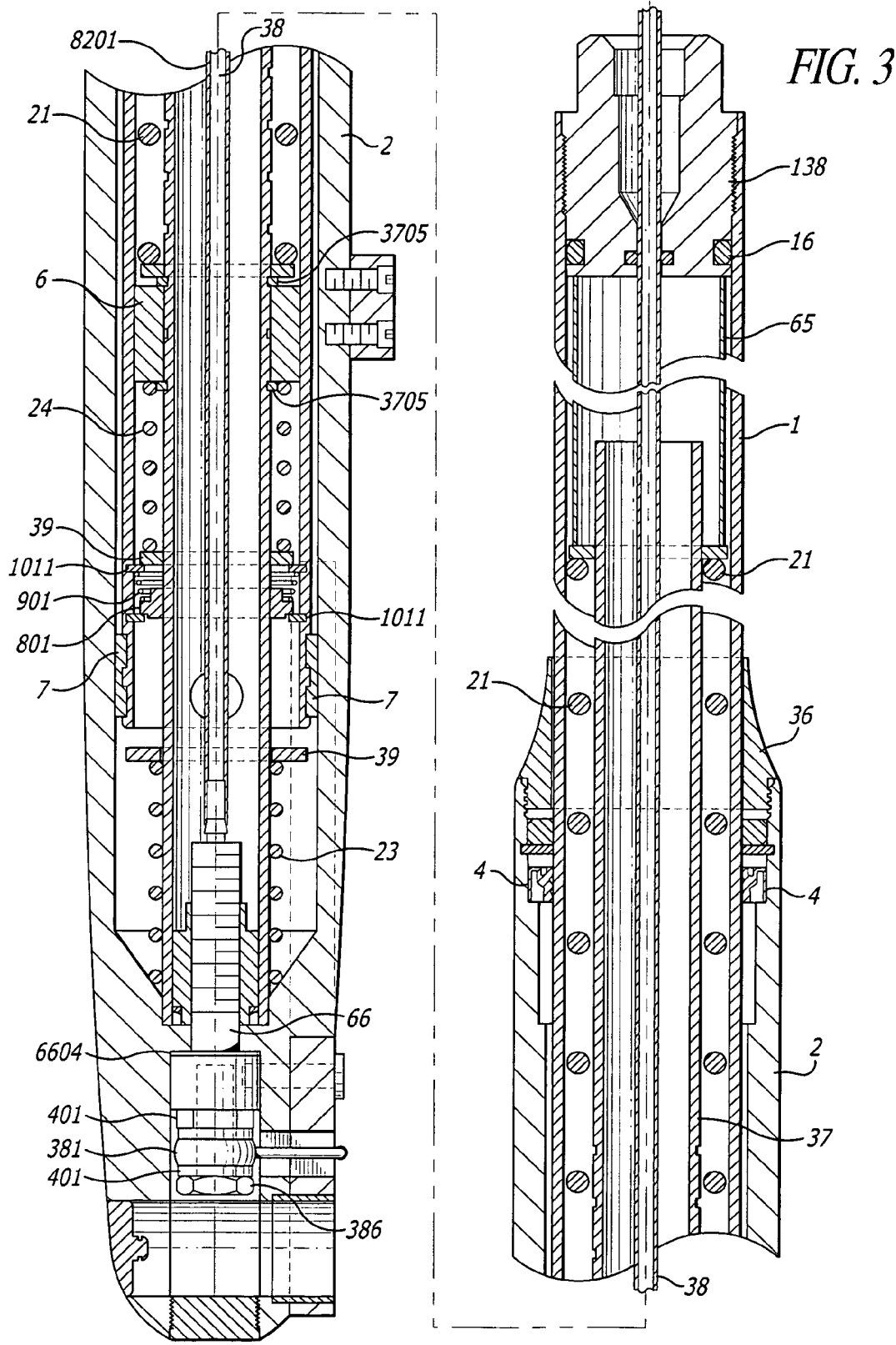
FIG. 3 is a cross section view of the present invention.

FIG. 3 shows brake line sheathing 8201 fitted over the brake line 38 to increase the stiffness of the brake line 38 and protect the brake line 38. The brake line 38 is adapted to the bolt 66. A damper bolt line crush washer 6604 fits between the bolt 66 and the banjo bolt 381. The banjo bolt 381 is secured between a pair of banjo nuts 401 and is tightened by the bottom banjo bolt nut 386.

The brake line 38 has a bottom end and a top end. The bottom end is attached to the bolt 66, and the line 38 passes through the outer tube 2, the inner tube 1, the push rod, the top out springs 24 and bottom out springs 23, the main spring 21 and the bottom out spacer 65. The top end passes through the body cap 138 and the upper fork tree 27 until it terminates at the brake actuator. The brake is shown on the right side in FIG. 2, but can be on the left side as well. Because most of the parts are symmetrical and interchangeable, the line can be run through either the left or right leg. The brake line is looped to allow slack. The loop is typically kept in the upper portion of the bottom out spacer. The loop is typically well lubricated because oil fills the fork leg. The loop can also be placed in other parts of the fork leg, but the bottom out spacer provides the most radius in the preferred embodiment and is also relatively free of entanglements. Although a single loop is preferable, a double loop can also be implemented. A double loop has the advantage of additional and redundant slack.

The vertical force generated, such as when the motorcycle hits a bump is transmitted from the wheel to the axle, and from the axle to the bottom portion of the outer tube 2, to the push rod, back to the bottom out spacer 65, then body cap 138. When the brake line 38 passes through the body cap 138, the body cap has an O-ring seal preventing escape of fluid from the fork leg.

When fully assembled, the directional control valve FIG. 3, 801 allows fluid flow in a single direction. The valve 801 is biased closed by the spring 901 and held within the valve snap ring 1011. The valve is designed to circulate hydraulic fluid within the fork leg as the opening and closing of valve acts as a pump. The valve is a one-way valve. Preferably, the valve is open on compression and closed on rebound to provide to a variable resistance better ride. The valve can be made so that it has controlled leaking to provide a softer ride. The circlip and push rod is the first embodiment of the adjustable length design. Threading the push rod and providing locking nuts that engage with the push rod can implement a second alternative embodiment of the adjustable length push rod. Threading the push rod is less preferable because length tolerances will not be as precise.

Typical materials can be used in construction of the motorcycle fork leg. For example, the body cap can be made of aluminum and the fork leg outer tube can be made of steel and that can receive a chrome finish. Internal components such as washers and springs can be made of spring steel or whatever is known in the art.

Although the present invention has been described in detail, persons of ordinary skill in the art understand obvious modifications. Therefore the invention is not intended to be limited except by the following claims. A call out list of elements is provided in the specification for convenience of the reader. The call out list of elements has been designed as a parts list to facilitate understanding of the invention.

CALL OUT LIST OF ELEMENTS

1 Inner Tube
2 Outer Tube
4 Piston Seal
6 Damper Rod Piston
7 Top Out Bushing
8 Directional Control Valve
801 Directional Control Valve
9 Directional Control Valve Spring
901 Directional Control Valve Spring
10 Valve Snap Ring
1011 Valve Snap Ring
11 Directional Control Valve Circlip
13 Body Cap
16 Caliper O-Ring
21 Main Spring
23 Bottom Out Spring
24 Top Out Spring
27 Upper Tree, Triple Clamp Upper
28 Lower Tree, Triple Clamp Lower
29 Caliper Bolts
31 Brake Bracket
331 Steering Stem Bolt
32 Fender Bracket
322 Fender Bracket Bolts
36 Seal Cover
37 Pushrod For Retainer Clips
3705 Spring Retainer Clip
38 Brake Line
381 Banjo Bolt
386 Bottom Banjo Nut
39 Bottom Out Washer
401 Banjo Nuts
42 Brake Bracket Bushing
57 Fork Leg Cover
65 Bottom Out Spacer
66 Damper Rod Retainer Bolt
8201 Brake Line Sheathing
8210 Bottom Washers The invention claimed:
1. A motorcycle brake and suspension system comprising:
an outer tube;
a mainspring mounted at least partially inside the outer tube, wherein the mainspring has a smaller diameter than the outer tube;
a pushrod mounted at least partially inside the mainspring, wherein the pushrod has a smaller diameter than the mainspring;

a brake line mounted at least partially inside the pushrod; wherein the brake line has a smaller diameter than the pushrod wherein the brake line is looped to allow slack and wherein the brake line is looped inside a bottom out spacer.

2. The motorcycle brake and suspension system of claim 1, wherein the brake line is looped inside the bottom out spacer to allow slack, and , wherein the pushrod mounted at least partially inside the mainspring has grooves, and wherein the pushrod has circlips to adjust a height of the suspension system, wherein the circlips bear the weight of the motorcycle brake and suspension system, wherein the body cap has an O-ring seal to prevent escape of fluid from the fork leg, further comprising a second set of circlips mounted below the first set of circlips, whereby a total of four circlips would be used in the motorcycle brake and suspension system having a pair of legs, further comprising a directional control valve mounted to an exterior surface of the pushrod.

3. The motorcycle brake and suspension system of claim 2, further comprising a top out spring and a bottom out spring.

4. A motorcycle brake and suspension system comprising:
an outer tube;
a mainspring mounted at least partially inside the outer tube, wherein the mainspring has a smaller diameter than the outer tube;
a pushrod mounted at least partially inside the mainspring, wherein the pushrod has a smaller diameter than the mainspring;
a brake line mounted at least partially inside the pushrod; wherein the brake line has a smaller diameter than the pushrod, wherein the pushrod mounted at least partially inside the mainspring has grooves, and wherein the pushrod has circlips to adjust a height of the suspension system.

5. A motorcycle brake and suspension system comprising:
an outer tube;
a mainspring mounted at least partially inside the outer tube, wherein the mainspring has a smaller diameter than the outer tube;
a pushrod mounted at least partially inside the mainspring, wherein the pushrod has a smaller diameter than the mainspring;
a brake line mounted at least partially inside the pushrod: wherein the brake line has a smaller diameter than the pushrod, wherein the pushrod mounted at least partially inside the mainspring has grooves, and wherein the pushrod has circlips to adjust a height of the suspension system, wherein the brake line is looped to allow slack.

6. A motorcycle brake and suspension system comprising:
an outer tube;
a mainspring mounted at least partially inside the outer tube, wherein the mainspring has a smaller diameter than the outer tube;
a pushrod mounted at least partially inside the mainspring, wherein the pushrod has a smaller diameter than the mainspring;
a brake line mounted at least partially inside the pushrod; wherein the brake line has a smaller diameter than the pushrod, further comprising circlips connectible to the pushrod, wherein the circlips adjust the height of the motorcycle brake and suspension system.

7. The motorcycle brake and suspension system of claim 6, wherein a body cap has an O-ring seal to prevent escape of fluid from the fork leg.

8. The motorcycle brake and suspension system of claim 6, further comprising a directional control valve mounted to an exterior surface of the pushrod.

9. A motorcycle brake and suspension system comprising:
an outer tube;
a mainspring mounted at least partially inside the outer tube, wherein the mainspring has a smaller diameter than the outer tube;
a pushrod mounted at least partially inside the mainspring, wherein the pushrod has a smaller diameter than the mainspring;
a brake line mounted at least partially inside the pushrod; wherein the brake line has a smaller diameter than the pushrod, wherein the push rod connects to a banjo bolt, wherein fluid pressure in the brake line passes through the banjo bolt to exit the outer tube.

10. A motorcycle brake and suspension system comprising:
an outer tube;
a mainspring mounted at least partially inside the outer tube, wherein the mainspring has a smaller diameter than the outer tube;
a brake line looped to allow slack mounted at least partially inside the outer tube; wherein the brake line has a smaller diameter than the outer tube; and
a pushrod mounted at least partially inside the mainspring, and wherein the pushrod has grooves and a circlip to adjust a height of the suspension system.

11. A motorcycle brake and suspension system comprising:
an outer tube;
a mainspring mounted at least partially inside the outer tube, wherein the mainspring has a smaller diameter than the outer tube;
a brake line looped to allow slack mounted at least partially inside the outer tube; wherein the brake line has a smaller diameter than the outer tube; and further comprising circlips connectible to the pushrod, wherein the circlips adjust the height of the motorcycle brake and suspension system.

12. The motorcycle brake and suspension system of claim 11, further comprising a body cap with an O-ring seal to prevent escape of fluid from the fork leg.

13. The motorcycle brake and suspension system of claim 11, further comprising a second set of circlips mounted below the first set of circlips, whereby a total of four circlips would be used in the motorcycle brake and suspension system having a pair of legs.

14. The motorcycle brake and suspension system of claim 11, further comprising a push rod that connects to a banjo bolt, wherein fluid pressure in the brake line passes through the banjo bolt to exit the outer tube.

15. A motorcycle brake and suspension system comprising:
an outer tube;
a mainspring mounted at least partially inside the outer tube, wherein the mainspring has a smaller diameter than the outer tube;
a pushrod mounted at least partially inside the mainspring, wherein the pushrod has a smaller diameter than the mainspring; wherein the pushrod mounted at least partially inside the mainspring, and wherein the pushrod engages with the mainspring at adjustable positions allowing height adjustment of the suspension system wherein the pushrod is mounted at least partially inside the mainspring has grooves, and wherein the pushrod has circlips to adjust a height of the suspension system.

16. The motorcycle brake and suspension system of claim 15, further comprising a directional control valve mounted to an exterior surface of the pushrod.

17. The motorcycle brake and suspension system of claim 15, further comprising a top out spring and a bottom out spring.

18. A motorcycle brake and suspension system comprising:
- an outer tube;
- a mainspring mounted at least partially inside the outer tube, wherein the mainspring has a smaller diameter than the outer tube;
- a pushrod mounted at least partially inside the mainspring, wherein the pushrod has a smaller diameter than the mainspring;
- a brake line passing through the pushrod; wherein the push rod hydraulically connects to a banjo bolt, wherein fluid pressure in the brake line passes through the banjo bolt to exit the outer tube.

19. The motorcycle brake and suspension system of claim 18, further comprising circlips connectible to the pushrod, wherein the circlips adjust the height of the motorcycle brake and suspension system.

20. The motorcycle brake and suspension system of claim 18, further comprising a directional control valve mounted to an exterior surface of the pushrod.

* * * * *